US007805525B2

(12) United States Patent
Grover (10) Patent No.: US 7,805,525 B2
(45) Date of Patent: Sep. 28, 2010

(54) SYSTEM AND METHOD FOR PROCESSING FIBRE CHANNEL (FC) LAYER SERVICE REQUESTS IN AN FC NETWORK

(75) Inventor: Rajiv K. Grover, Folsom, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1823 days.

(21) Appl. No.: 10/425,599

(22) Filed: Apr. 30, 2003

(65) Prior Publication Data

US 2004/0221047 A1 Nov. 4, 2004

(51) Int. Cl.
*G06F 15/16* (2006.01)
(52) U.S. Cl. .......................... 709/229; 709/224; 726/27
(58) Field of Classification Search ................ 709/203, 709/229, 224; 726/27
See application file for complete search history.

(56) References Cited

U.S. PATENT DOCUMENTS

| | | | |
|---|---|---|---|
| 6,343,324 B1 | 1/2002 | Hubis et al. | |
| 6,353,612 B1 | 3/2002 | Zhu et al. | |
| 6,421,711 B1 | 7/2002 | Blumenau et al. | |
| 6,877,042 B2 * | 4/2005 | Tawil et al. ................. | 709/250 |
| 6,988,130 B2 * | 1/2006 | Blumenau et al. ........... | 709/213 |
| 7,036,013 B2 * | 4/2006 | Renganarayanan et al. . | 713/178 |
| 2003/0163802 A1* | 8/2003 | Takahashi ................... | 717/136 |

OTHER PUBLICATIONS

Fibre Channel SAN Security w w w.networkmagazine.com/article/NMG20020826S0012-35k-Sep. 10, 2002.
Fibre Channel Security Whitepaper w w w.falconstor.com/Whitepapers/ FibreChannelSecurity.pdf.
NetworkStorageForum: SANS/NAS Features: The Basics of SAN Security-Part I w w w.enterprisestorageforum.com/sans/features/article/0,,10556_1431341,00.html-Sep. 10, 2002.
NetworkStorageForum: SANS/NAS Features: The Basics of San Security—Part II w w w.enterprisestorageforum.com/sans/features/article/0,,10556_1433091,00.html-Sep. 10, 2002.
A storage solution with a security problem w w w.fcw.com/fcw/articles/2002/ 0204/tec-san-02-04-02.asp-Sep. 10, 2002-Cached-Similar pages.
LUN Access Security in a SAN w w w.imperialtech.com/pdf/LUN_Security.PDF.
Integrated New s Solutions: Broadcasting's New Paradigm of At-Will Workflow w w w.broadcastpapers.com/asset/LeitchINS04.htm.
Advancing Security in Storage Area Networks Whitepaper Brocade Communications Systems, Inc., 2001.
Networked Storage: Security Framework Considerations Hitachi Data Systems, Dec. 2001.
Vendors to Tighten Fibre Channel Nets w w w.nwfusion.com/news/2002/131383_04-01-2002.html—Apr. 1, 2002.

* cited by examiner

*Primary Examiner*—Ario Etienne
*Assistant Examiner*—El Hadji M Sall (57) ABSTRACT

A method for processing a fiber channel (FC) layer service request at a target node of an FC network may include receiving the FC layer service request from an initiator node, extracting a permanent identifier and a temporary identifier from the received FC layer service request, and determining whether a match exists between the extracted temporary identifier and a temporary identifier stored in association with the extracted permanent identifier. A security access device and computer-readable code arrangement may include similar features.

36 Claims, 9 Drawing Sheets

SYSTEM AND METHOD FOR PROCESSING FIBRE CHANNEL (FC) LAYER SERVICE REQUESTS IN AN FC NETWORK

BACKGROUND OF THE INVENTION

A storage area network (SAN) can be defined as a dedicated fibre channel network of interconnected storage devices and servers (more generally known as nodes), which offers any-to-any communication, i.e., any two nodes can communicate with each other. Accordingly, communication is possible between any storage device and any server, thus allowing multiple servers to access the same storage device independently. Furthermore, some storage devices may directly communicate with each other, enabling back up and replication of stored data to take place without impacting server performance.

A fibre channel network is a scalable data network for connecting heterogeneous systems (e.g., super computers, mainframes, and work stations) and peripherals (e.g., disk array storage devices, and tape libraries). Fibre channel enables almost limitless numbers of devices to be interconnected, and supports speeds of up to five times the current protocols and distances of up to 10 kilometers between system and peripheral device. However, fibre channel is not a secure protocol.

Fibre channel networks generally control access to data according to logical unit numbers (LUNs), which are allocated to portions of the data storage capacity in the SAN. For example, a LUN can be assigned to multiple disks in an array device, or to a single tape, or to a portion of a hard disk. Each LUN appears to an operating system (OS) as a logical device.

A World Wide Name (WWN) is a permanent identifier, which can be used to uniquely identify any system or peripheral, or any port belonging to a system or peripheral. In a fibre channel network, a host can be granted authorization to access a certain LUN by associating a WWN of the host (or of a port of the host) with the LUN. However, because of the any-to-any communication nature of the fibre channel network, an unauthorized host may be able to gain access to a LUN by stealing the identity, i.e., spoofing the WWN, of a host authorized for that LUN.

SUMMARY OF THE INVENTION

One of the embodiments of the invention is directed to a method for processing a fibre channel (FC) layer service request at a target node of an FC network. Such a method may include: receiving a fibre channel (FC) layer service request from an initiator node; extracting a permanent and temporary identifier from the FC layer service request; and determining whether a match exists between the extracted temporary identifier and a temporary identifier stored in association with the extracted permanent identifier.

Another of the embodiments of the present invention is directed to a method for processing a port login (PLOGI) request at a target node of an FC network. Such a method may include: receiving the PLOGI request from an initiator node; extracting a permanent identifier from the PLOGI request; and determining whether a match exists between the extracted permanent identifier and a stored permanent identifier.

Another of the embodiments of the present invention is directed to an access security device for controlling access to a target node in an FC network. Such a device may include: request processing means for extracting a permanent identifier and a temporary identifier from a received FC layer service request, the extracted permanent identifier and the extracted temporary identifier corresponding to an initiator node; lookup means for performing a lookup of a login table using the extracted permanent identifier to detect a temporary identifier stored in association with the extracted permanent identifier in the login table; and request invalidation means for rejecting the FC layer service request if the extracted temporary identifier does not match the detected temporary identifier.

Another of the embodiments of the present invention is directed to a code arrangement on a computer-readable medium for use in a system comprising an FC switch, a device connected to the FC switch, and one or more hosts connected to the FC switch, each of the hosts having an associated permanent identifier and temporary identifier, execution of the code arrangement preventing any of the hosts to gain access to the device by spoofing a permanent identifier associated with another host. Such a computer-readable code arrangement may include: a login table including one or more permanent identifiers, each of the permanent identifiers in the login table being stored in association with a temporary identifier; and a service request filtering code for receiving an FC layer service request sent by an initiator host to the device, the FC layer service request including a temporary identifier of the initiator host and a permanent identifier; extracting the temporary identifier of the initiating host and the permanent identifier from the FC layer service request; and performing a lookup of the login table using the extracted permanent identifier to determine whether the initiator host has permission to access the device.

Other features and advantages of the invention will become more apparent from the detailed description hereafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The invention will become more fully understood from the detailed description and the accompanying drawings, wherein:

FIGS. 2-9 are UML sequence drawings. Messages and/or actions are depicted with arrows of different styles. A ⟶ indicates a message that expects a response message. A ⋯ indicates a response message.

DETAILED DESCRIPTION OF THE EMBODIMENTS

The following description of embodiments of the invention is merely illustrative in nature, and is no way intended to limit the invention, its application, or uses.

In a fibre channel (FC) network, an initiator node may send one or more FC layer service requests to be processed by a target node. Such service requests may include port login (PLOGI) requests, registered state change notifications (RSCNs), discover address (ADISC) requests, and discover port (PDISC) requests.

For example, an initiator node (e.g., a host) can transmit a PLOGI request to a target node (e.g., a storage device) in order to login and gain access to the data stored within the target node. In the embodiments presented below, the initiator node and target node will be described as a host and a storage device for the sake of convenience. However, it should be noted that the initiator node and target node of the invention are not so limited. The target node of the invention should be construed to cover any type of device, peripheral, system, etc. capable of performing FC layer service requests. Likewise, the initiator node includes any type of system, device, peripheral, routers, bridges, etc. capable of requesting FC layer services from such target nodes.

In one embodiment according to the invention, a PLOGI request, like other FC layer service requests, includes a World Wide Name (WWN) associated with the port of the host from which the request is sent. A WWN is an example of a permanent identifier, which is assigned by a name registration authority. Examples of WWNs include World Wide Port_Names (WW_PN) that identify ports of a node, and World Wide Node_Names (WW_NN) that identify nodes in the network. One or both of the WW_PN and the WW_NN may be included in an FC layer service request.

In one embodiment of the present invention, the WW_PN or a portion thereof, may be used as a permanent identifier. However, the invention should not be construed as being limited to this embodiment. For example, in one embodiment of the invention, a combination of the WW_PN and the WW_NN. Other types of nonvolatile identifiers assigned to a node or node port of an FC network, as will be contemplated by those of ordinary skill in the art, may be used.

The PLOGI request also includes a source identifier (SID) assigned to the host. An SID is an example of a temporary identifier, which is assigned by the FC network to nodes of the systems and devices connected to the network. An implicit security feature of FC networks prevents two different nodes from using the same SID.

In FC service layer requests, the SID may comprise a port identifier (Port_ID) used to identify the port of a node that originates the request. In one embodiment of the present invention, the Port_ID may be used as the temporary identifier. However, the present invention should not be construed as thus limited, and other types of temporary identifiers, as will be contemplated by those of ordinary skill in the art, may be used.

A storage device may maintain a data structure (i.e., login table) storing the WWN and SID of each PLOGI request processed by the device. In conventional FC networks, a storage device verifies a received PLOGI request by making sure that the SID in the request is different from every other SID in the login table. If so, the storage device allows the host, which sent the PLOGI request, to access LUNs associated with the WWN in the PLOGI request. Accordingly, if the requesting host is spoofing the WWN of another host, it can access any data assigned to the other host in the storage device.

To solve this problem, additional security may be implemented according to one embodiment of the invention. In this embodiment, a storage device receiving a PLOGI request extracts the WWN and the SID from the PLOGI request, and performs a lookup of the login table based on the extracted WWN. If this lookup determines that there is no entry in the login table corresponding to the WWN extracted from the PLOGI request (e.g., the extracted WWN does not match any of the WWNs stored in the login table), the device concludes that no other host is actively logged into the device using the same WWN.

However, if there is an entry in the login table storing the extracted WWN in association with an SID, the device compares the extracted SID of the PLOGI request with the SID in the login table. If these SIDs do not match, the device is alerted that a possible spoofing of the WWN has occurred, and thereby refuses to process the PLOGI request by sending a service reject (LS_RJT) notification to the requesting host. The device may also initiate a logout (LOGO) of the other hosts, which are already actively logged in. In case the extracted SID matches the SID in the login table, the device continues to operate with that host.

When the storage device does not find a login table entry corresponding to the extracted WWN based on the login table lookup, the device may further perform a login history table lookup based on the extracted WWN to verify the PLOGI request. Each entry in the login history table contains a WWN, and the most recent SID used in connection with that WWN to log into the device. Accordingly, if the login history table has an entry for the extracted WWN, the device compares the extracted SID of the PLOGI request with the SID stored in this entry. If these SIDs match, the PLOGI request may be verified and processed by the device.

If the SIDs do not match, the device may be alerted that a possible spoofing of the WWN has occurred, and a warning may be generated in a user-viewable console or user interface at the storage device. Such a warning may also be recorded in logs maintained by the storage device and later reviewed by personnel. Accordingly, personnel responsible for maintaining the storage device may be alerted if a possible security breach has occurred. In addition, or as an alternative, a security breach warning may be sent to a remote user console from the device, or to other network components that perform security functions for the FC network.

The lookup performed on the login table can be referred to as an active PLOGI security process because it checks the PLOGI request against actively logged-in hosts. The lookup of the login history table to be referred to as an inactive PLOGI security process because it verifies the PLOGI request against PLOGI requests received from hosts, which are no longer actively logged in.

It should be noted that the active PLOGI security process can also be performed for other types of FC layer service requests, including registered state change notifications (RSCNs), discover address (ADISC) requests, or discover port (PDISC) requests. In these instances, the device receiving the request extracts the WWN and the SID from the request, and performs a lookup of the login table using the extracted WWN. If the lookup indicates that the extracted WWN is not currently logged into the device, the device can reject the host's request by issuing an LS_RJT that notifies the host that a PLOGI request is required. If the WWN is logged in, the device will compare the extracted SID with the SIDs stored in the login table in association with the extracted WWN, in order to determine whether or not to process the request. If the SIDs match, the received request will be processed; if not, the device sends a LS_RJT of the requesting hosts.

According to an alterative embodiment of the invention, an FC switch may verify a PLOGI request sent by a host to a storage device. The FC switch may require hosts and devices to perform fabric logins (FLOGIs) in order to transmit and receive data via the switch. In this embodiment, when an initiator host sends a PLOGI request destined for a particular target device, the FC switch can extract the WWN and the SID from the PLOGI request, and perform a lookup of a fabric login table (FLOGI table), which stores the WWNs and SIDs associated with the processed FLOGI requests. Thus, the FC switch ensures the consistency of the WWN contained in the FLOGI request and the PLOGI request sent by the same host.

Figure 1:
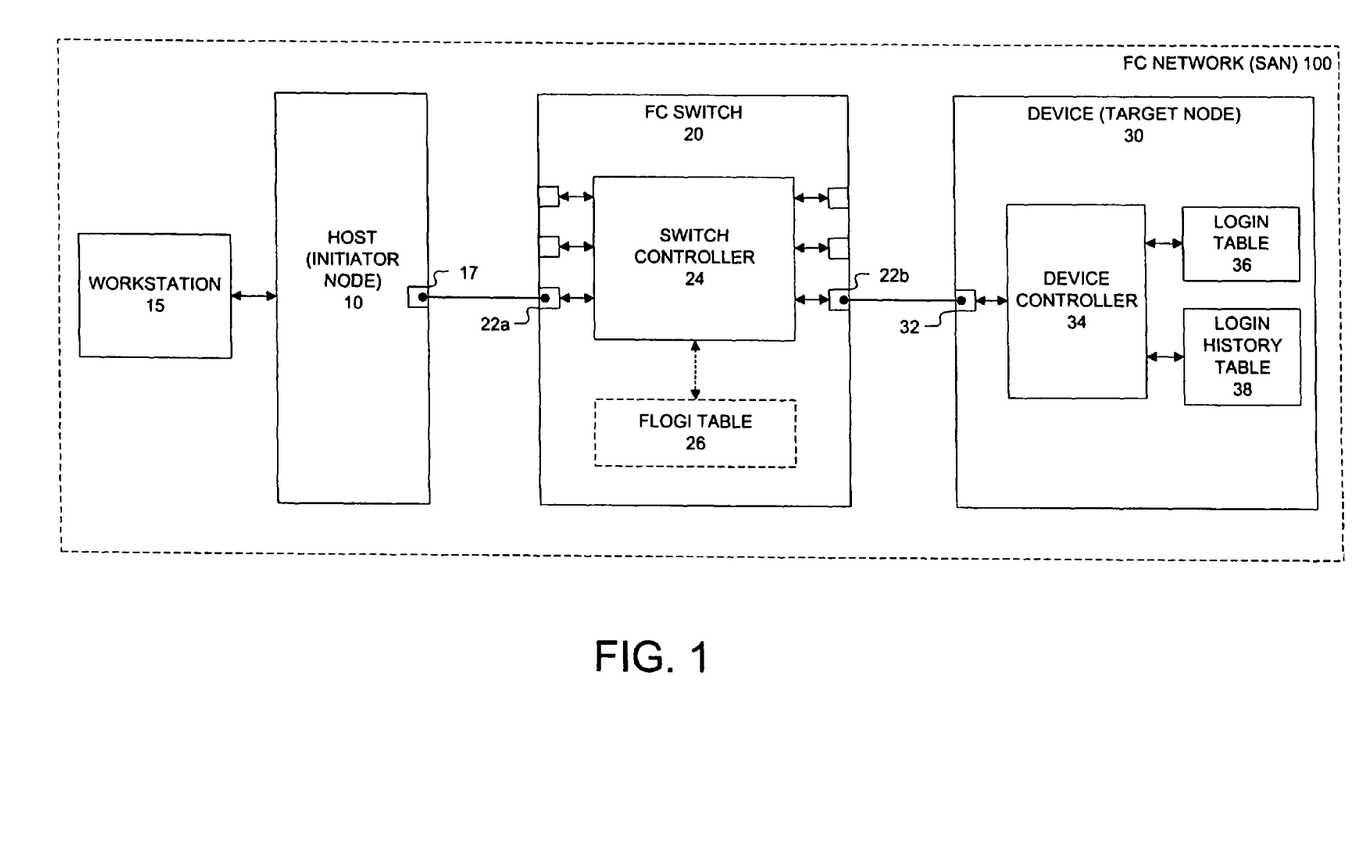
FIG. 1 is a block diagram illustrating a system for implementing one embodiment of the invention.

FIG. 1 is a block diagram of a system implementing the invention according to one embodiment. An FC network 100 includes a host 10 having a port 17, which is connected to port 22A of an FC switch 20 via fibre channel. The FC switch 20 includes a switch controller 24, which is operable to connect port 22A to port 22B. Port 22B is connected, via fibre channel, to port 32 of a device 30, which includes a device controller 34, a login table 36, and a login history table 38. It should be noted that FIG. 1 is merely illustrative, and does not limit the invention. For example, according to one embodiment, port 17 of the initiator host 10 may be directly connected to port 32 of device 30. In another alternative embodiment, the FC network 100 may include an arbitrated loop configuration.

The device controller 34 of device 30 may comprise one or more processors, or other types of hardware known in the art, for processing FC layer service requests received by port 32. The received service request may be processed by extracting the WWN and the SID from the request. The device controller 34 may further include one or more processors and/or hardware for performing a lookup of the login table 36 and the login history table 38 based on the extracted WWN, and determining whether or not the service request is valid based on the lookups. Although the login table 36 and the login history table 38 are described above as being implemented in the device 30, the invention is not thus limited. The login table 36 and/or the login history table 38 may be located at alternative locations in the FC network 100 accessible to the device 30, even though such alternative locations may sometimes be less efficient.

The host 10 may include one or more processors and/or hardware devices for generating an FC layer service request, and transmitting the service request from port 17 to a destination node in the FC network 100. The host 10 may be connected to one or more work stations 13, which allow users to access data and perform other operations on the FC network using the host.

An FC switch 20 for connecting the host 10 to the device 30 may be a fabric switch, which may include a switch controller 24 operable to process FLOGI requests and relay FC layer service requests and messages between the nodes of the FC network 100. As noted above, the invention does not require an FC switch 20, and equally applies to an FC network 100 that connects nodes via a hub or client-to-client configuration.

Also, the switch controller 24 may be operable to check the uniqueness of the WWN in a PLOGI request sent by initiator host 10 to target device 30, as discussed above with respect to an alternative embodiment. In this embodiment, the switch controller may include a processor and/or hardware for extracting the WWN and the SID from the PLOGI request, and performing a lookup of a FLOGI table 26 containing the WWN and SID of each node currently logged into the switch 20. The FLOGI table 26 is shown in FIG. 1 in a dotted box to indicate that it is associated with an alternative embodiment, and therefore not required by the invention.

The operation of the elements shown in FIG. 1 will be described below in connection with FIGS. 2-7. These figures are for purposes of illustration only, and do not limit the invention.

Figure 2:
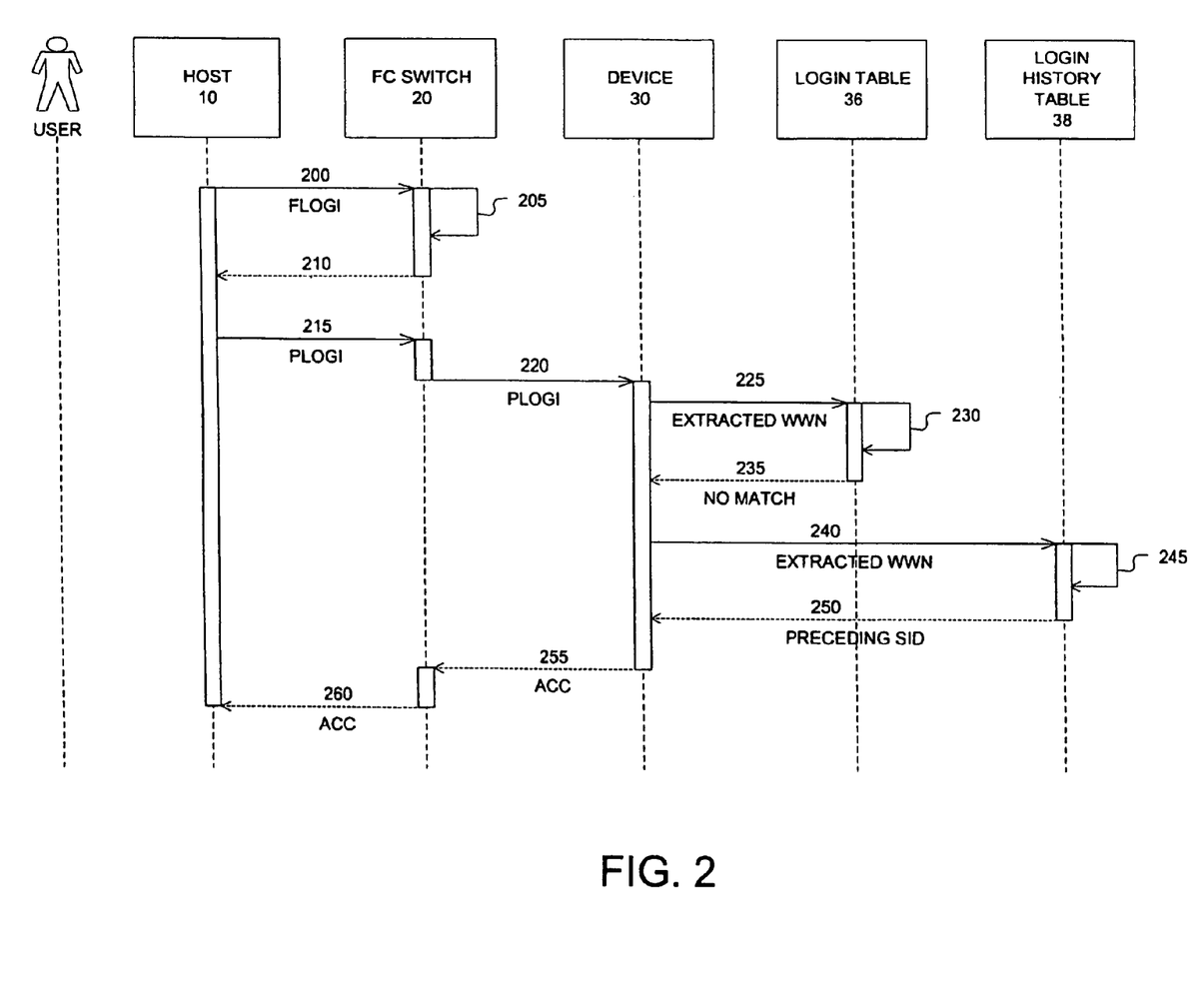
FIG. 2 is a sequence diagram illustrating the process by which a device uses a login table and a login history table to authorize a first port login (PLOGI) request received from a host according to one embodiment of the invention.

FIG. 2 is a sequence diagram illustrating the operation by which a device 30 verifies a PLOGI request received from a host 10 based on the login table 36 and login history table 38. The host 10 initially sends an FLOGI request 200 from its port 17 to port 22a of the FC switch 20 in order to perform fabric login. The FC switch verifies the FLOGI request (as indicated by self-message 205), and sends a return 210 to the host 10 indicating that fabric login has been performed. The host 10 then sends a PLOGI request 215 to the FC switch 20, which is then relayed from port 22b of the FC switch 20 to port 32 of the device 30.

As described above, this PLOGI request includes a WWN of the port 17 from which the host 10 transmitted the request, or alternatively, contains a WWN assigned to the host 10 itself. The device controller 34 extracts the WWN and the SID from the PLOGI request, and sends the extracted WWN to the login table 36 as shown by message 225 in order to perform a lookup in the login table 35 using this WWN.

According to self-message 230, the login table 36 performs the lookup. Since there is no matching entry indicating that the extracted WWN is actively logged into the device 30, message 235 indicates to device 30 that no match has been found in the login table 36. Subsequently, the device 30 performs inactive PLOGI security processing by sending the extracted WWN 240 to the login history table 38. A lookup of the login history table 38 is performed based on the extracted WWN as indicated in self-message 245. When an entry in the login history table 38 is found containing the extracted WWN, the associated SID contained in that entry (referred to as the preceding SID) is sent back to the device 30 in message 250. Accordingly, if device 30 determines that the preceding SID of the login history table 38 matches the extracted SID, the device 30 will perform the port login for the initiator node 10, and send an accept message (ACC) 260 indicating that the host 10 is logged in.

Figure 3:
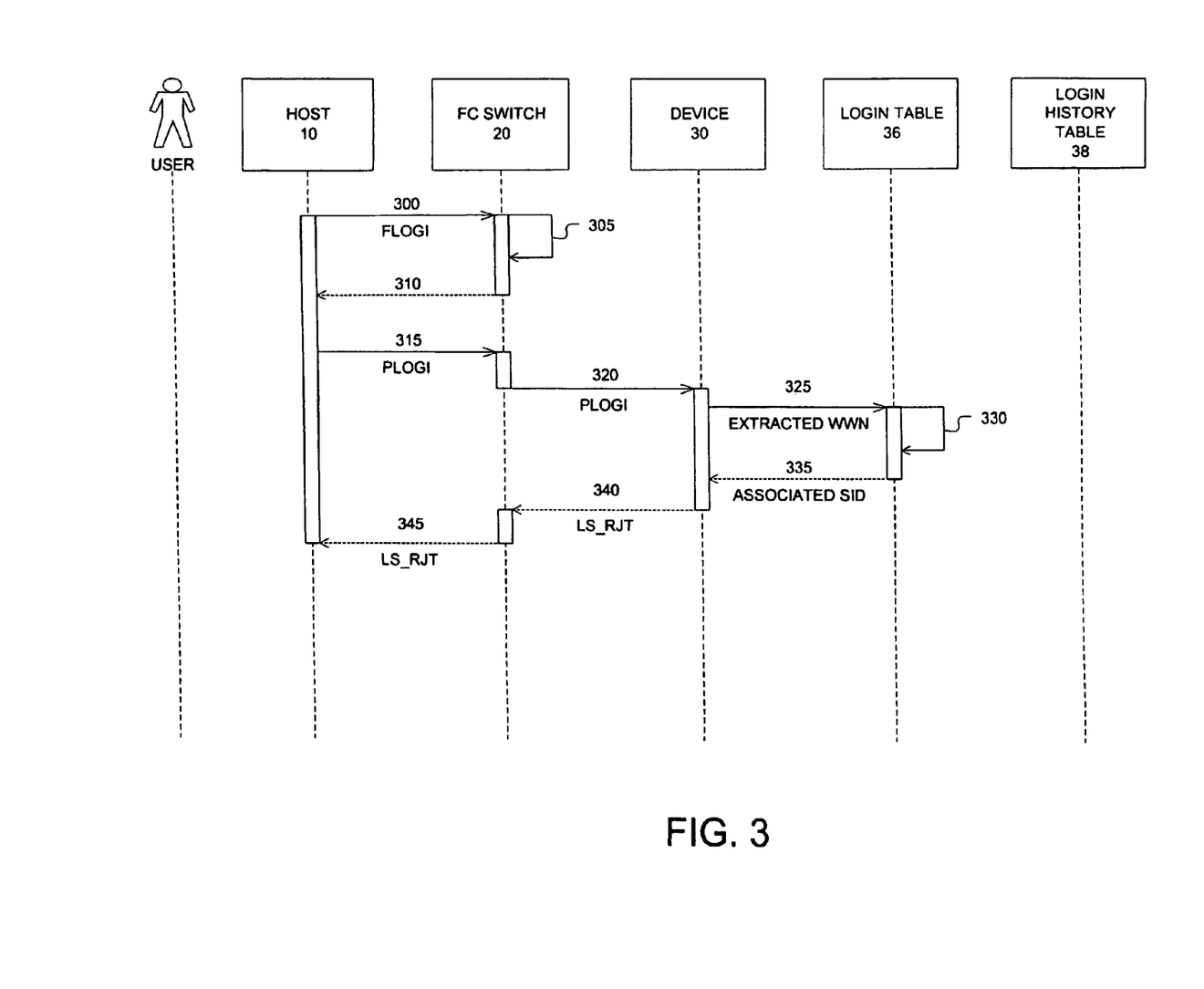
FIG. 3 is a sequence diagram illustrating the process by which a device rejects a PLOGI request received from a host according to one embodiment of the invention.

FIG. 3 is a sequence diagram illustrating the operation by which a device 30 rejects a PLOGI request from an initiator node 10 based on a login table lookup according to the active PLOGI security processing. Similar to messages 200-210 of FIG. 2, messages 300-310 show the initiator host 10 performing an FLOGI with the FC switch 20. Further, similar to messages 315-330, the PLOGI request is sent from the initiator node 10 to the device 30 via FC switch 20, and a lookup is performed in login table 36 based on the extracted WWN of the request.

However, in the example of FIG. 3, the login table 36 includes an entry corresponding to the extracted WWN including an associated SID. The associated SID is transmitted back to the device 30 in message 335, and the device 30 determines that the associated SID does not match the extracted SID. Accordingly, the device 30 determines that another host is already logged into the device 30 using the same WWN extracted from the PLOGI request. The device 30 is therefore alerted that a possible WWN spoofing has occurred and sends an LS_RJT in message 340, which is relayed by the FC switch 20 as LS_RJT message 345 to the host 10, thereby rejecting the PLOGI request. The device 30 may also be configured to initiate a LOGO (not shown in FIG. 3) for the other host using the extracted WWN. The device 30 may do so based on the fact that the other host may have spoofed the WWN associated with the initiator host 10.

Figure 4:
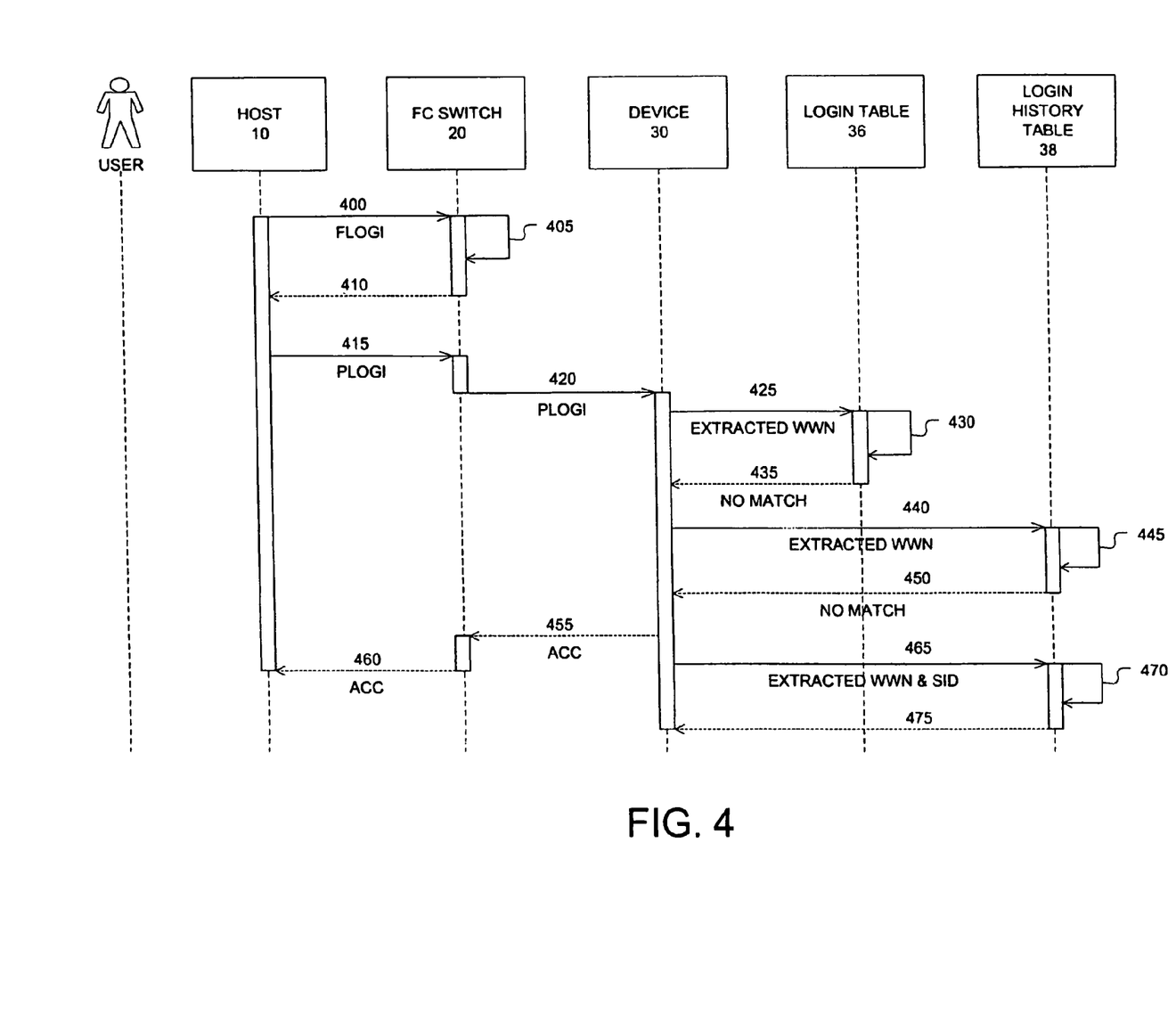
FIG. 4 illustrates a process by which a device authorizes a PLOGI request whose WWN contains no entry in the login history table, according to one embodiment of the invention.

FIG. 4 is a sequence diagram illustrating the operation whereby device 30 verifies a PLOGI request, containing a WWN having no corresponding entry in a login history table 38 for the device 30. The operations illustrated in FIG. 4 are the same as those in FIG. 2 up to the point where the device 30 performs a lookup of the login history table 38 based on the extracted WWN i.e., messages 400-445 in FIG. 4 are the same as messages 200-245 in FIG. 2. However, in FIG. 4, the lookup of the login history table 38 determines that no proceeding SID is stored in association with the extracted WWN, (as indicated by message 450). The device 30 therefore indicates to the host 10 that the port login will be performed, as indicated by messages 455 and 460. The device 30 also instructs the login history table to store the extracted SID in association with the extracted WWN in message 465. The login history table 38 stores the extracted SID in association with the extracted WWN (e.g., in the same data record) as shown in self-message 470. After the data is written to the login history table 38, processing is completed as shown by return message 475.

Figure 5:
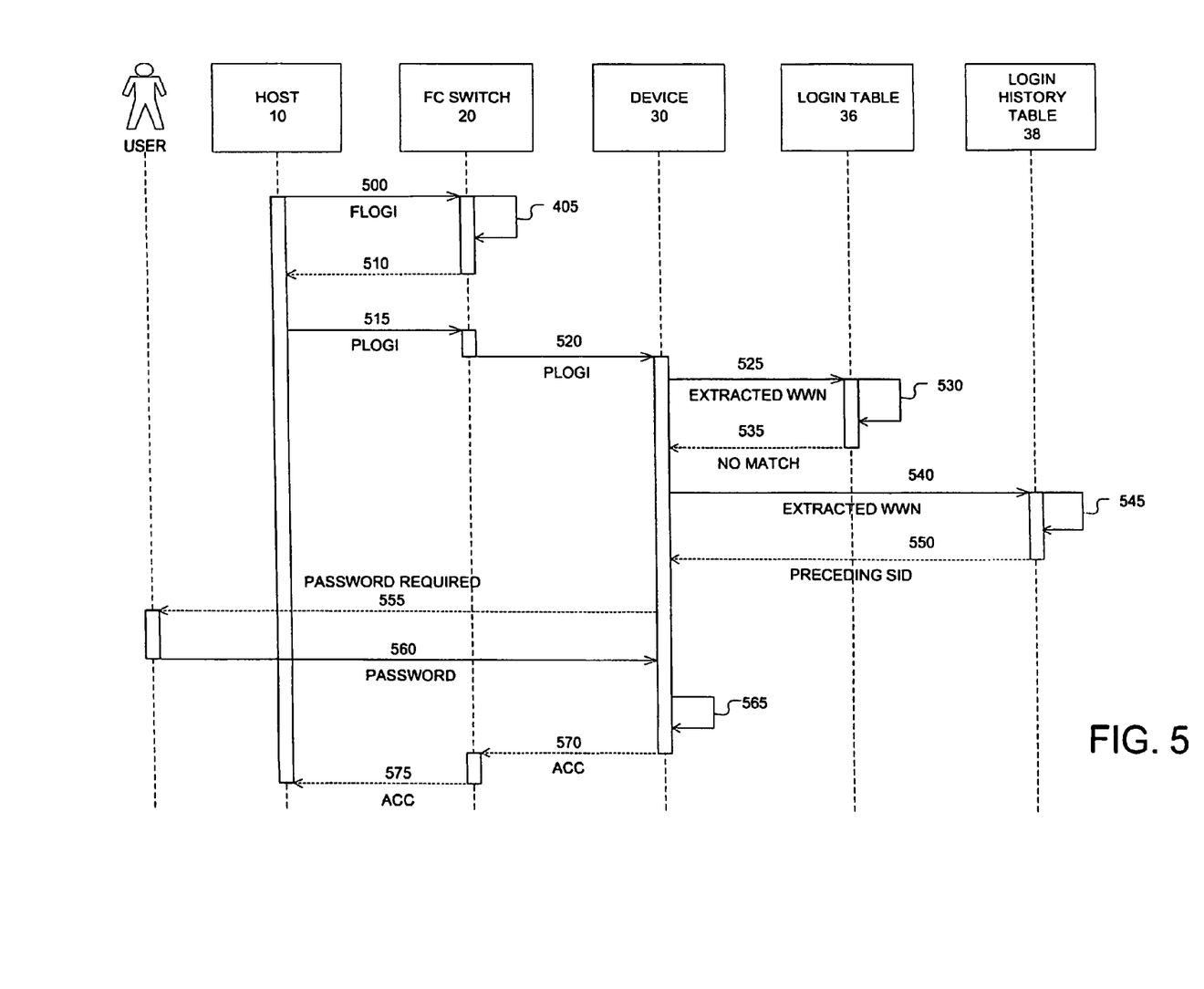
FIG. 5 is a sequence diagram illustrating the process by which a device determines that a possible security breach has occurred based on a login history table according one embodiment of the invention.

FIG. 5 is a sequence diagram illustrating the operation whereby the device 30 detects a possible security breach by determining that the extracted WWN of the PLOGI request has previously been logged into the device 30 with a different SID. The process of FIG. 5 is the same as FIG. 2 up to the point where the login history table 38 returns a preceding SID to the device 30. Accordingly, messages 500-550 of FIG. 5 are the same as messages 200-250 of FIG. 2. However, in FIG. 5, the device 30 determines that the preceding SID of message 550 does not match the extracted SID of the PLOGI request. Accordingly, a security breach warning is generated in the device controller 34 (for example, in a service processor) of device 30.

According to one embodiment, as illustrated in FIG. 5, the device 30 may provide a password lock feature in association with the security breach warning, which requires a password to be input at a user-accessible console or user interface at the device 30 in order for the device 30 to perform a port login of the initiator host 10. Alternatively, a user may enter the password using a console or interface at another location via, e.g., TCP/IP services.

Message 555 may be displayed on the console or user interface of the device 30 to indicate that a password is required. Accordingly, the user may input the password 560 for authentication by the device 30 (in self-message 565). ACC messages 570 and 575 indicate that the password has been authenticated and the PLOGI request will be processed.

This password lock feature may be useful in situations where the FC network 100 assigns new SIDs to the nodes based on, for example, a reconfiguration of the network 100 or the addition of new nodes. However, in an alternative embodiment, the device 30 may respond to the security breach warning by merely denying the PLOGI request and sending a LS_RJT notification to the host 10 accordingly.

Figure 6:
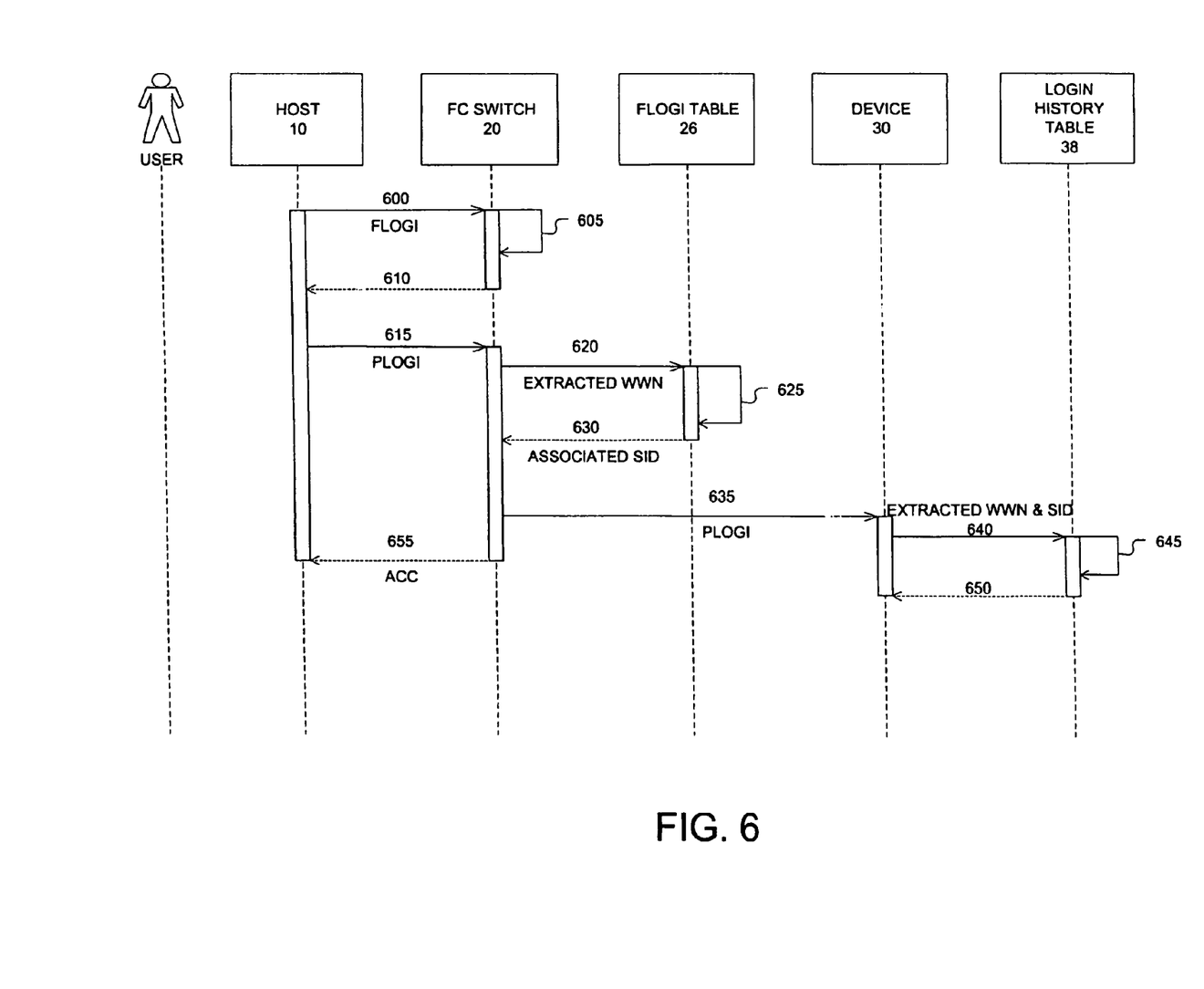
FIG. 6 is a sequence diagram illustrating the process by which a fibre channel (FC) switch authorizes a host's PLOGI request to log into a device according to one embodiment of the invention.

FIG. 6 is a sequence diagram illustrating an embodiment of the invention in which the FC switch 20 verifies a PLOGI request received from initiator host 10 for device 30. According to messages 600-615, the FC switch 20 performs a fabric login of host 10. Thereafter, host 10 sends a PLOGI request 615 to the FC switch 20, which then performs a lookup of the FLOGI table 26 using the extracted WWN 620.

As indicated by self-message 625, an entry in the FLOGI table 26 containing the extracted WWN is found. The associated SID in this entry is sent back to the FC switch 20 in message 630. After determining the associated SID matches the extracted SID in the PLOGI request, the FC switch 20 sends the PLOGI request to the device 30. The device 30 may then extract the WWN and SID from the request, and send them in message 640 to the login history table 38. Self-message 645 shows the WWN and SID being stored in the login history table 38, and return message 650 indicates completion of storage operation. The host 10 is notified that its PLOGI request has been verified by the FC switch 20 when it receives ACC message 655.

FIG. 6 illustrates a situation where the FC switch 20 verifies a received PLOGI request according to a lookup of the FLOGI table 26. However, if the extracted SID does not match the SID associated with extracted WWN in the FLOGI table 26, the FC switch 20 may not send the PLOGI request to the device 30. Further, the FC switch 20 may be configured to perform a fabric logout of any host 10 whose PLOGI request is rejected based on the lookup of the FLOGI table 26.

The verification process illustrated in FIG. 6, may be performed using any combination of hardware and/or software in an FC switch 20 contemplated by one ordinarily skilled in the art. In addition, an FC switch 20 may perform this procedure in conjunction with other feature, e.g., zoning, to provide added measures of security.

It should be noted that in this embodiment, the FLOGI table may be maintained in the FC switch 20 as shown in FIG. 1. Alternatively, the FLOGI table 26 may be maintained elsewhere, e.g., at another location in the FC network 100, although such alternative locations may be less efficient.

Figure 7:
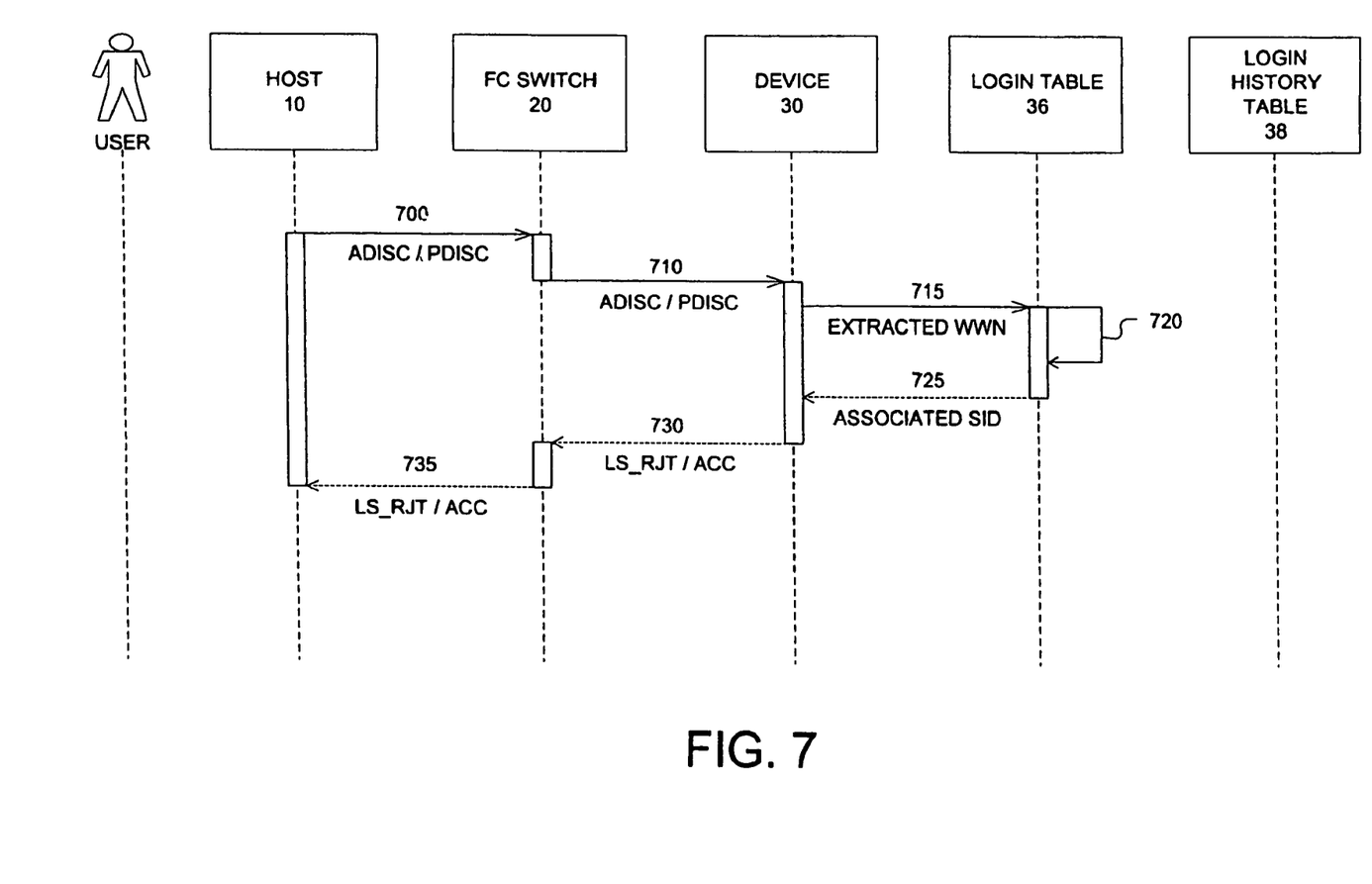
FIG. 7 is a sequence diagram illustrating the processing of an FC layer service request whose WWN is actively logged into the target device according to one embodiment of the present invention.
Figure 8:
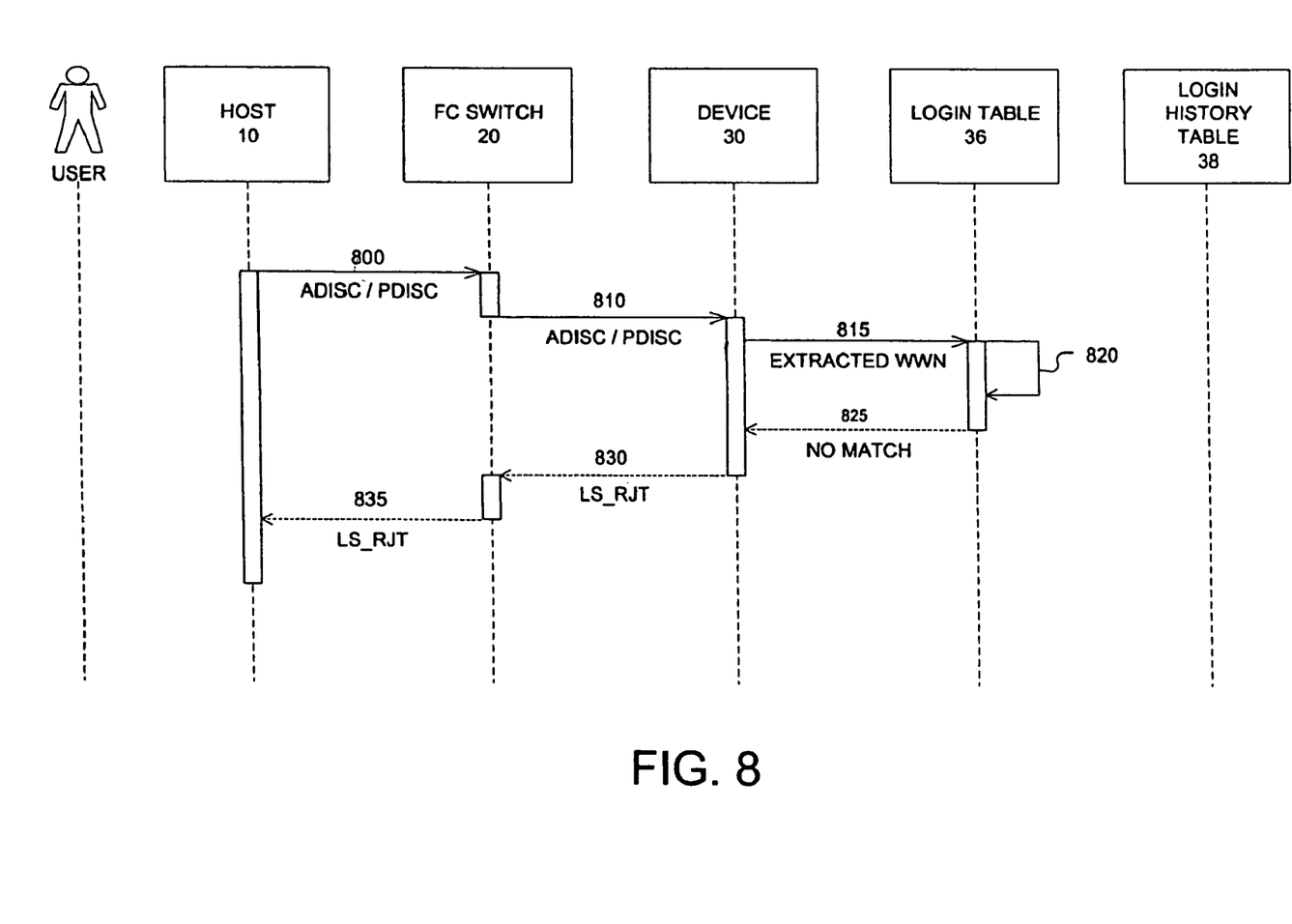
FIG. 8 is a sequence diagram illustrating the processing of an FC layer service request whose WWN is not actively logged into the target device according to one embodiment of the present invention.

While FIGS. 2-6 illustrate situations where the initiator host 10 sends a PLOGI request to the device 30, the invention can also be used with other types of FC layer service requests and commands as illustrated in FIGS. 7 and 8. Such service requests may include discover address (ADISC) requests, discover port (PDISC) requests, and registered state change notifications (RSCNs). It should be noted that the foregoing list of FC layer service requests and commands is merely illustrative and not meant to be a comprehensive list of all requests and commands covered by the invention.

FIGS. 7 and 8 are sequence diagrams illustrating situations where the host 10 sends an FC layer request other than a PLOGI request to the device 30. For the purposes of FIGS. 7 and 8, it will be assumed that the FC switch 20 has already performed a fabric login of the requesting host 10. Accordingly, the messages associated with sending and verifying an FLOGI request are not shown in either of these figures.

FIG. 7 is a sequence diagram illustrating the processing of an FC layer service request by the device 30, in which the WWN of the service request is already actively logged into the device 30. The initiator host 10 sends the FC layer service request in message 700 to the FC switch 20, which relays the service request to device 30 in message 710. The FC layer service request may be an ADISC or PDISC, as shown in FIG. 7, or any other type of FC layer service request as will be contemplated by those ordinarily skilled in the art. The device 30 extracts the WWN and SID from the received service request, and sends the extracted WWN to the login table 36 in message 715.

A lookup is performed on the login table 36 based on this extracted WWN, as indicated by self-message 720. Since the extracted WWN is already logged in, the lookup of the login table 36 will return an SID associated with the extracted WWN in message 725. The device 30 then compares the extracted SID with the returned SID in order to determine whether a match occurs. If SIDs match, ACC messages 730 and 735 indicate to the host 10 either the results of the processed service request, or that the service request will be processed by the device 30. However, if the device 30 determines that SIDs do not match, and that the initiator host 10 may be spoofing a WWN of another host, the device 30 will send a LS_RJT notification via messages 730 and 735 to the host 10.

It should be noted that in FIG. 7, if the FC layer service request is verified based on the login table 36 lookup, the device 30 does not need to write the extracted WWN and SID to the login history table 38. This step will have already been performed at the time the device 30 initially processes the PLOGI of the host 10.

FIG. 8 is a sequence diagram illustrating a situation in which the WWN of the FC layer service request is not actively logged into the device 30. Processing in FIG. 8 is the same as that in FIG. 7 up to the point where the device 30 initiates the lookup of the login table 36 using the extracted WWN. Accordingly, messages 800-820 of FIG. 8 are the same as messages 700-720 shown in FIG. 7.

However, based on the lookup of the login table 36 in FIG. 8 (self-message 820), the device 30 is notified by message 825 that no SID is stored in the login table 36 in association with the extracted WWN. The device 30 determines that the extracted WWN is not currently logged in. Accordingly, the device 30 may send an LS_RJT notification to the host 10, via FC switch 20, indicating that a PLOGI is required by the host 10 in order to process the FC layer service request.

In an alternative embodiment, the device 30 may respond to message 825 by performing another lookup of the login table based on the extracted SID to determine whether the host 10 has already logged into the device 30 using another WWN. If this secondary lookup (which is not shown in FIG. 8) indicates that the host 10 is actively logged into the device 30 using another WWN, the device 30 may perform a LOGO of the host 10. If the secondary lookup of the login table 36 indicates that the host's SID has not yet been logged into the device 30, the LS_RJT notification requiring a PLOGI may then be transmitted to the host 10.

Figure 9:
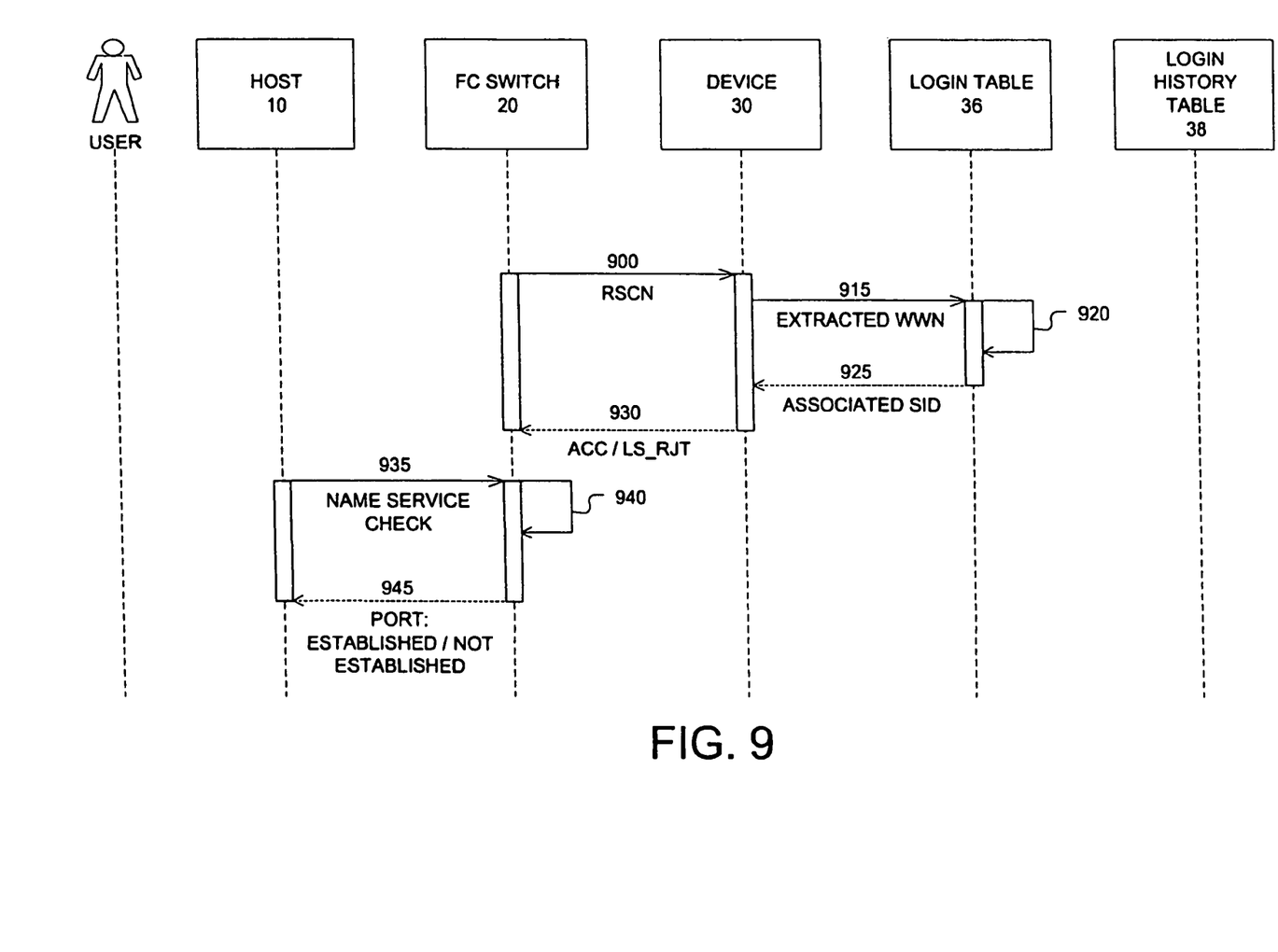
FIG. 9 is a sequence diagram illustrating the processing of a registered state change notification (RSCN) request by the target device according to one embodiment of the present invention.

FIG. 9 is a sequence diagram illustrating the processing of a registered state change notification (RSCN) request by the device 30 according to one embodiment. The FC switch 20 may send the RSCN request in message 900 to inform the device 30 whether the host 10 is "ready" to communicate (e.g., when link connectivity is established between the host 10 and the link 20). Accordingly, the device 30 extracts the WWN and SID from the RSCN, and sends the extracted WWN in message 915 to the login table 36. Based on a lookup performed using the extracted WWN, the login table 36 sends an associated SID in message 925 to the device 30. If the associated and extracted SIDs match, the device 30 sends an ACC to the FC switch 20 in message 930 to indicate that the host 10 is allowed to communicate to the device 30. Alternatively, if the SIDs do not match, an LS_RJT will be sent in message 930 to the FC switch 20.

If the FC switch 20 receives and ACC from the device 30 in message 930, a port will be established in the switch 20 between the host 10 and the device 30. Alternatively, if a LS_RJT is received in message 930, the FC switch 20 will not establish such a port. The host 10 may query the FC switch 20 to determine whether a port has been established to the device 30 by sending a name service check, as shown in 935. The FC switch 20 may respond to the name service check in message 845 by indicating whether or not a port between the host 10 and the device 30 has been established.

Although FIGS. 2-9 above illustrate the processed FC layer service request as being one of a PLOGI, ADISC, PDISC, and RSCN, the processed FC layer service request is not thus limited. Security processing may be performed on any FC layer service request as will be contemplated by those of ordinary skill in the art.

According to one embodiment, inactive PLOGI security processing may be turned off or deactivated during certain situations. For example, a flag may be set in the device 30 for disabling security processing during these situations. When the inactive PLOGI security processing is turned off, the login history table 38 will be deactivated and unable to process any lookup requests. Accordingly, any received PLOGI request can be verified by the device 30 based only on a lookup of the login table 36 (i.e., based solely on the active PLOGI security feature).

Accordingly, the login history table 38 may be deactivated immediately after an initial set up of the FC network 100, or after a reconfiguration of the network 100 in which one or more systems or peripherals are added, removed, or relocated. As a result of such changes, the network 100 may need to assign different SIDs to the hosts, and the WWN-SID associations in a login history table 38 will need to be updated. Deactivation of the inactive PLOGI security processing may also occur after an initial set up of the device 30 because the login history table 38 will not include any entries since no port logins have been performed for the device 30. Security processing may be reactivated after the initial set up or reconfiguration (e.g., by resetting a flag in the device 30 to enable security processing). The reactivation of security processing may be performed either by automated means, or manually via a user interface of the device 30.

The invention being thus described, it will be apparent that the same may be varied in many ways. Such variations are not to be regarded as a departure from the spirit and scope of the invention, and all such modifications as would be readily apparent to one skilled in the art are intended to be included in the scope.

What is claimed is:

1. A method for processing a fibre channel (FC) layer service request at a target node of an FC network, the method comprising:

receiving the FC layer service request from a particular initiator node;

extracting a permanent identifier and a temporary identifier from the received FC layer service request;

performing an active login security process when the permanent identifier extracted from the FC layer service request matches a permanent identifier stored in a login table, wherein the active login security process involves checking information from the FC layer service request against first information corresponding to at least another initiator node logged into the target node, wherein the first information is in the login table; and performing an inactive login security process when the permanent identifier extracted from the FC layer service request fails to match a permanent identifier stored in a login table, wherein the inactive login security process involves checking information from the FC layer service request against second information corresponding to at least another initiator node that is no longer logged into the target node, wherein the second information is in a login history table;

wherein performing the inactive login security process comprises:

generating a security breach warning if the information from the FC layer service request does not match the second information in the login history table; and permitting the particular initiator node to login if the information from the FC layer service request matches the second information in the login history table.

2. The method of claim 1, wherein the received FC layer service request includes at least one of: a port login (PLOGI) request, a registered state change notification (RSCN), a discover address (ADISC) request, and a discover port (PDISC) request.

3. The method of claim 1, wherein performing the active login security process comprises:

performing a lookup in the login table to determine whether the extracted permanent identifier matches a stored permanent identifier in the login table, and rejecting the FC layer service request if the extracted permanent identifier does not have a match in the login table, and if the FC layer service request does not include a port login (PLOGI) request.

4. The method of claim 3, wherein the login table stores a temporary identifier in association with a permanent identifier for each initiator node actively logged into a port of the target node, wherein the first information includes the temporary identifier for each initiator node actively logged into the port of the target node.

5. The method of claim 1, further comprising:

executing the FC layer service request if it is determined that a match exists on the extracted temporary identifier with the first information in the login table, wherein the information from the FC layer request includes the extracted temporary identifier.

6. The method of claim 1, further comprising:

rejecting the FC layer service request if it is determined that no match exists on the extracted temporary identifier with the first information in the login table, wherein the information from the FC layer request includes the extracted temporary identifier.

7. The method of claim 1, further comprising:

storing the extracted temporary identifier in the login history table in association with the extracted permanent identifier.

8. The method of claim 1, wherein performing the inactive login security process comprises:

performing a lookup of the login history table to detect a preceding temporary identifier stored in association with the extracted permanent identifier, wherein the second information includes the preceding temporary identifier;

permitting the particular initiator node to login if no preceding temporary identifier is detected;

wherein a security breach warning is generated if the preceding temporary identifier does not match the extracted temporary identifier, wherein the information from the FC layer request includes the extracted temporary identifier; and wherein the particular initiator node is permitted to login if the preceding temporary identifier matches the extracted temporary identifier.

9. The method of claim 8, wherein generating the security breach warning includes requiring a user of the particular initiator node to provide a password in response to the generated security breach warning, the particular initiator node being permitted to login if the password is authenticated.

10. The method of claim 9, wherein the extracted temporary identifier is a source identifier (SID) assigned by the FC network to a port of the particular initiator node; and wherein the extracted permanent identifier is a world wide name (WWN) corresponding to a port of the particular initiator node.

11. An access security device for controlling access to a target node in a fibre channel (FC) network, comprising:

an input/output port to receive FC layer service requests from initiator nodes; and a controller adapted to implement security procedures in response to the FC layer service requests, comprising:

extracting a permanent identifier and a temporary identifier from a received FC layer service request, the extracted permanent identifier and the extracted temporary identifier corresponding to a particular initiator node;

performing an active login security process when the permanent identifier extracted from the FC layer service request matches a permanent identifier stored in a login table, wherein the active login security process involves checking the extracted temporary identifier against a temporary identifier corresponding to at least another initiator node logged into the target node, wherein the temporary identifier corresponding to the at least another initiator node is in the login table; and performing an inactive login security process when the permanent identifier extracted from the FC layer service request fails to match a permanent identifier stored in a login table, wherein the inactive login security process involves checking the extracted temporary identifier against a temporary identifier corresponding to at least another initiator node that is no longer logged into the target node, wherein the temporary identifier corresponding to the at least another initiator node that is no longer logged into the target node is in a login history table;

wherein the inactive login security process comprises:

generating a security breach warning if the extracted temporary identifier from the FC layer service request does not match the temporary identifier in the login history table; and permit the particular initiator node to login if the extracted temporary identifier from the FC layer service request matches the temporary identifier in the login history table.

12. The access security device of claim 11, wherein:

the controller is configured to authorize the target node to process the FC layer service request if the temporary identifier in the login table matches the extracted temporary identifier.

13. The access security device of claim 12, wherein the controller is configured to:

detect a port login (PLOGI) request included in the FC layer service request; and reject the FC layer service request if a temporary identifier is not stored in association with the extracted permanent identifier in the login table, and if the FC layer service request includes no PLOGI request.

14. The access security device of claim 13, wherein the controller is configured to:
  validate a detected PLOGI request if the temporary identifier is not stored in association with the extracted permanent identifier in the login table.

15. The access security device of claim 14, wherein the controller is integrated in a fabric switch in the FC network, the login table being updated according to fabric login (FLOGI) requests executed by the fabric switch.

16. The access security device of claim 14, wherein the controller is configured to:
  detect a preceding temporary identifier stored in association with the extracted permanent identifier in the login history table;
  validate the PLOGI request if the preceding temporary identifier matches the extracted temporary identifier;
  validate the PLOGI request if the login history table lookup determines that no preceding temporary identifier is stored association with the extracted permanent identifier in the login history table; and
  invalidate the PLOGI request if the preceding temporary identifier does not match the extracted temporary identifier.

17. The access security device of claim 16, wherein the controller is configured to:
  authorize the target node to execute the PLOGI request if the PLOGI request is validated.

18. The access security device of claim 17, wherein the controller is configured to:
  update the login history table in response to the PLOGI request being executed by the target node, the login history table being updated to store the extracted temporary identifier in association with the extracted permanent identifier.

19. The access security device of claim 18, wherein
  the extracted permanent identifier is a world wide name (WWN) corresponding to a port of the particular initiator node; and wherein
  the extracted temporary identifier is a source identifier corresponding assigned by the FC network to the port of the initiator node corresponding to the WWN.

20. The access security device of claim 19 wherein the controller is integrated in the target node, wherein the login table is updated according to PLOGI requests executed by the target node.

21. A non-transitory computer-readable medium storing a code arrangement for use in a system comprising a fibre channel (FC) switch, a device connected to the FC switch, and one or more hosts connected to the FC switch, each of the hosts having an associated permanent identifier and temporary identifier, execution of the code arrangement by one or more processors preventing any of the hosts to gain access to the device by spoofing a permanent identifier associated with another host, the code arrangement comprising:
  a login table including one or more permanent identifiers, each of the permanent identifiers in the login table being stored in association with a temporary identifier; and
  a service request filtering code for
    receiving an FC layer service request sent by a particular initiator host to the device, the FC layer service request including a temporary identifier of the particular initiator host and a permanent identifier,
    extracting the temporary identifier of the particular initiating host and the permanent identifier from the FC layer service request,
    performing an active login security process when the permanent identifier extracted from the FC layer service request matches a permanent identifier stored in a login table, wherein the active login security process involves checking the extracted temporary identifier against a temporary identifier corresponding to at least another initiator host logged into the target node, wherein the temporary identifier corresponding to the at least another initiator host is in the login table; and
    performing an inactive login security process when the permanent identifier extracted from the FC layer service request fails to match a permanent identifier stored in a login table, wherein the inactive login security process involves checking the extracted temporary identifier against a temporary identifier corresponding to at least another initiator host that is no longer logged into the target node, wherein the temporary identifier corresponding to the at least another initiator host that is no longer logged into the target node is in a login history table;
  wherein the inactive login security process comprises:
    generating a security breach warning if the extracted temporary identifier from the FC layer service request does not match the temporary identifier in the login history table; and
    permitting the particular initiator host to login if the extracted temporary identifier from the FC layer service request matches the temporary identifier in the login history table.

22. The non-transitory computer-readable medium of claim 21, wherein the extracted permanent identifier is a world wide name (WWN) associated with the particular initiator host, and the extracted temporary identifier is a source identifier (SID) associated with the particular initiator host.

23. The non-transitory computer-readable medium of claim 22, wherein the service request filtering code further includes code for
  preventing the device from executing the FC layer service request if the lookup of the login table detects an SID stored in association with the extracted WWN in the login table, and if the detected SID does not match the extracted SID.

24. The non-transitory computer-readable medium of claim 23, wherein the service request filtering code further includes code for
  rejecting the FC service layer request if the lookup of the login table does not detect that a SID is stored in the login table in association with the extracted WWN, and if the FC layer service request does not include a PLOGI request.

25. The non-transitory computer-readable medium of claim 23, wherein
  the login table stores an SID in association with a WWN for each host actively logged into a port of the FC switch; and wherein
  the service request filtering code being executed by a processor integrated with the FC switch.

26. The non-transitory computer-readable medium of claim 22:
  wherein the login history table includes one or more entries, each entry including a WWN and an SID from a previously executed port login (PLOGI) request, the login history table being in one of an activated and a deactivated state, wherein the service request filtering code further includes code for
detecting a port login (PLOGI) request in the FC layer
service request;
performing a lookup of the login history table using the
extracted WWN if the login history table is activated,
to determine whether the particular initiator host has
permission to log into the device.

27. The non-transitory computer-readable medium of
claim 26, wherein the login history table is deactivated in
response to at least one of: an initial setup of the device; one
or more hosts being added to the system; and one or more of
the hosts connected to the FC switch being reconfigured.

28. The non-transitory computer-readable medium of
claim 26, wherein the service request filtering code further
includes code for
detecting, based on the lookup of the login history table, a
preceding SID stored in association with the extracted
WWN in the login history table;
executing the PLOGI request if the preceding SID matches
the extracted SID;
wherein the security breach warning is generated if the
preceding SID does not match the extracted SID.

29. The non-transitory computer-readable medium of
claim 28, wherein the security breach warning is sent to at
least one of a user interface and user-viewable console, the
security breach warning indicating that the extracted WWN
has been spoofed.

30. The non-transitory computer-readable medium of
claim 28, wherein the service requires filtering code further
includes code requiring a password from a user of the initiating host in response to the generated security breach warning, the PLOGI request being executed if the password is authenticated.

31. A method for processing a port login (PLOGI) request
at a target node of a fibre channel (FC) network, comprising:
receiving the PLOGI request from a particular initiator
node;
extracting a permanent identifier from the PLOGI request;
performing an active login security process when the permanent identifier extracted from the PLOGI request
matches a permanent identifier stored in a login table,
wherein the active login security process involves
checking information from the PLOGI request against
first information corresponding to at least another initiator node logged into the target node, wherein the first
information is in the login table; and
performing an inactive login security process when the
permanent identifier extracted from the PLOGI request
fails to match a permanent identifier stored in a login
table, wherein the inactive login security process
involves checking information from the PLOGI request
against second information corresponding to at least
another initiator node that is no longer logged into the
target node, wherein the second information is in a login
history table;
wherein performing the inactive logging security process
comprises:
generating a security breach warning if the information
from the PLOGI request does not match the second
information in the login history table; and
permit the particular initiator node to login if the information from the PLOGI request matches the second
information in the login history table.

32. The method of claim 31, further comprising:
determining, if a match is determined for the extracted
permanent identifier, whether a match exists between
the a temporary identifier extracted from the PLOGI
request and a temporary identifier stored in the login
table in association with the stored permanent identifier;
and
rejecting the PLOGI request if it is determined that the
extracted temporary identifier does not match the stored
temporary identifier.

33. The method of claim 31, further comprising performing a lookup in the login table using the extracted permanent
identifier to determine whether a match exists on the extracted
permanent identifier, the login table storing a permanent identifier for each initiator node actively logged-into a port of the
target node.

34. The method of claim 31, further comprising:
using the login history table to determine whether the particular initiator node is permitted to login if a match does
not exist on the extracted permanent identifier; and
executing the PLOGI request if the particular initiator node
is permitted to login.

35. The method of claim 34, further comprising:
storing a temporary identifier extracted from the PLOGI
request in the login history table in association with the
extracted permanent identifier if the PLOGI request is
executed.

36. The method of claim 34, further comprising:
performing a lookup of the login history table to detect a
preceding temporary identifier stored in association
with the extracted permanent identifier;
permitting the particular initiator node to login if no preceding temporary identifier is detected;
wherein the security breach warning is generated if the
preceding temporary identifier does not match the
extracted temporary identifier; and
wherein the particular initiator node is permitted to login if
the preceding temporary identifier matches the extracted
temporary identifier.

* * * * *

UNITED STATES PATENT AND TRADEMARK OFFICE
CERTIFICATE OF CORRECTION

PATENT NO. : 7,805,525 B2  Page 1 of 1
APPLICATION NO. : 10/425599
DATED : September 28, 2010
INVENTOR(S) : Rajiv K Grover It is certified that error appears in the above-identified patent and that said Letters Patent is hereby corrected as shown below:

In column 13, line 23, in Claim 16, delete "stored association" and insert -- stored in association --, therefor.

In column 14, line 62, in Claim 26, delete "claim 22:" and insert -- claim 22, --, therefor.

In column 16, line 15, in Claim 32, delete "the a" and insert -- a --, therefor.

Signed and Sealed this
Twelfth Day of April, 2011

David J. Kappos
*Director of the United States Patent and Trademark Office*